United States Patent [19]

Woods

[11] Patent Number: 4,762,494
[45] Date of Patent: Aug. 9, 1988

[54] PSYCHOTHERAPY DEVICE

[76] Inventor: Ruth E. Woods, 2041 N.W. 12th Rd., Gainesville, Fla. 32605

[21] Appl. No.: 27,356

[22] Filed: Mar. 18, 1987

[51] Int. Cl.⁴ .................. G09B 19/00; G09B 23/30; A63H 3/16
[52] U.S. Cl. ............................ 434/236; 434/262; 434/270; 446/100; 446/321; 446/339; 446/372
[58] Field of Search ............... 434/236, 262, 267, 270; 446/100, 321, 337, 338, 339, 372, 295

[56] References Cited

U.S. PATENT DOCUMENTS

| | | | |
|---|---|---|---|
| 1,138,412 | 5/1915 | Radick | 446/321 |
| 1,340,512 | 5/1920 | Wild | 446/100 |
| 1,916,811 | 7/1933 | Schwartz | 446/100 |
| 2,327,059 | 8/1943 | Pal | 446/337 |
| 2,729,023 | 1/1956 | Lerner et al. | |
| 2,781,611 | 2/1957 | Bills et al. | 446/295 X |
| 2,959,891 | 11/1960 | Barnett et al. | 434/267 X |
| 3,210,884 | 10/1965 | Sharff et al. | 446/100 X |
| 3,783,553 | 1/1974 | Goozner | 446/372 |
| 3,811,220 | 5/1974 | Glass et al. | |
| 4,075,785 | 2/1978 | Neuschatz | 446/295 |
| 4,122,628 | 10/1978 | Crowell et al. | |
| 4,208,832 | 6/1980 | Corriveau | |
| 4,504,240 | 3/1985 | Thomas | 446/100 |
| 4,573,927 | 3/1986 | Newman | 434/236 |
| 4,710,145 | 12/1987 | Hall Vandis | 434/236 X |

FOREIGN PATENT DOCUMENTS 2013508 8/1979 United Kingdom .............. 446/100

Primary Examiner—William H. Grieb
Attorney, Agent, or Firm—Bradford E. Kile

[57] ABSTRACT

A psychotherapy device comprising a body member, a pair of arms, legs, and a head connected to the body member wherein said pyschotherapy device is in the general configuration of a child-like human figure. The head includes a pair of expressionless eyes and nose which are permanently affixed to the face and means are connected to the face adjacent to and generally below each of the permanent eyes for releasably receiving indicia of tears wherein during pyschotherapy of a child patient, the patient may be invited to apply or remove tears to reflect a current or past metal state.

15 Claims, 3 Drawing Sheets

U.S. Patent    Aug. 9, 1988    Sheet 3 of 3    4,762,494
FIG. 6
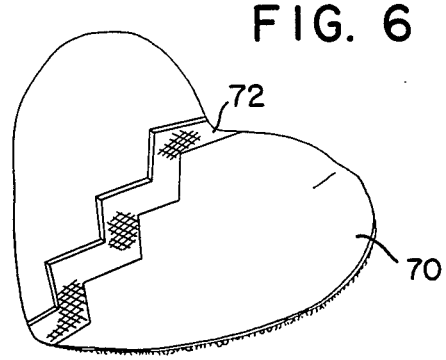
FIG. 7
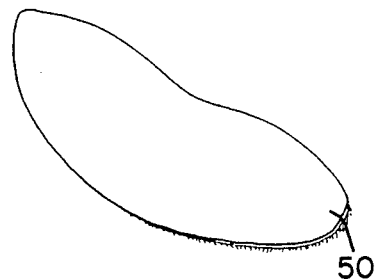
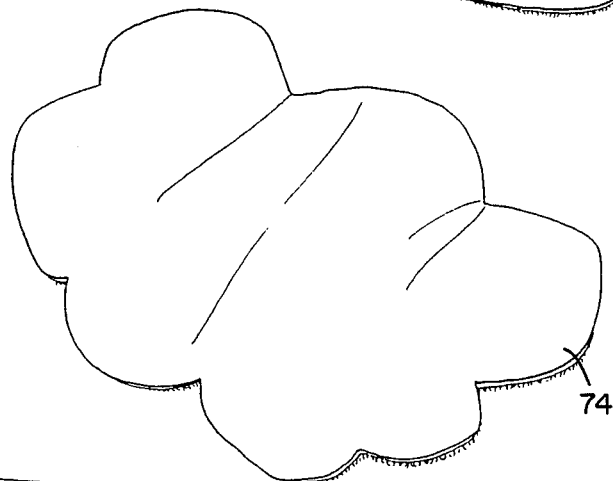
FIG. 8
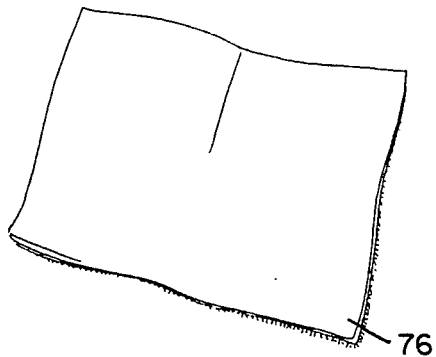
FIG. 9

PSYCHOTHERAPY DEVICE

BACKGROUND OF THE INVENTION

This invention relates to a device for use by psychologists and psychiatrists in connection with evaluation of pre-school and childhood patients in a psychotherapeutic milieu. More particularly the invention relates to a novel psychotherapeutic device which may be advantageously utilized to facilitate communication between a child and a therapist.

Psychotherapy may be thought of in its broadest context as a conversation with a therapeutic purpose. The ultimate goals of psychotherapy include: release of a patient's pent-up feelings; conditioning or reconditioning of particular responses; examination of a patient's values, concepts and attitudes; muscular relaxation; identification of unconscious impulses; etc.

Success in attaining such goals depends upon the particular attitude of the patient with respect to the therapist and an ability of the therapist to communicate with the patient. In this connection, at its core is a unique relationship between a clinician and a patient in which there is communication which can relieve distress and set conditions for relearning and personal growth. Broadly speaking, psychotherapy describes an intentional application of psychological techniques by a clinician to the end of effecting sought after personality, attitude or behavioral changes.

A psychotherapist is simultaneously compassionate and dispassionate. The therapist plays a supportive role in advancing the well-being of a patient by using training, knowledge, intelligence and empathy to understand and guide the patient. The central core of the relationship and ability to provide useful assistance stems from an ability to communicate both verbally and non-verbally with the patient. This is particularly true with children who are limited in the scope and complexity of their perception and communication.

There are a myriad of psychotherapy techniques that have been found to be helpful for adult patients of which the most well known is the Rogers client-centered approach; however, behavior therapy for children can become quite complicated. In this connection, an adult usually refers himself to therapy while a child is typically referred by others. An adult is more likely to understand the role of therapy and to share many of a therapist's objectives while a child must be provided with an intrinsically interesting experience in order to sustain motivation. In addition, adults usually have adequate verbal ability for verbal psychotherapy. Children on the other hand often must be reached on a non-verbal level.

An important psychotherapy technique attempts to utilize a child's pleasure in play. Play becomes, in such a context, a medium of communication allowing a therapist to build a relationship with the patient. A playroom provides a milieu for therapy which a child may express feelings, even unacceptable or unpleasant ones, such as anger at parents or fear of death.

In the past, toys have been commonly used in play therapy including sand boxes, crayons, finger paints, dolls, etc. Toys such as dolls have been employed to help children communicate with respect to physical or sexual abuse. These dolls deal with the relationship between the child and abuser and are used by the child to express events, cause and effect, resulting emotions, and desired outcomes.

Although techniques and devices which have been known in the past provide a form of useful play therapy with children, communication with a patient can be exacerbated in instances of a child in a life threatening circumstance; such as, a child with terminal cancer or a child which has been the subject of no fault traumatic mutilation through burn, mechanical dismemberment, etc. In these and other situations, it would be highly desirable for a therapist to have a psychotherapy device that would be easy to use, would not rely on developed verbal skills and may be used to express emotion when there is no person or thing to blame for a child's circumstance.

The limitations of prior child psychotherapy devices suggested in the preceding are not intended to be exhaustive, but rather are among many which may tend to limit of effectiveness of prior therapy techniques and devices. Other noteworthy limitations may exist, however, those suggested in the preceding should be sufficient to demonstrate that child psychotherapy devices appearing in the past will admit to worthwhile improvement.

OBJECTS OF THE INVENTION

It is a general object of the invention to provide a novel, psychotherapy device which will be effective for enhancing communication with pre-school and childhood patients.

It is a specific object of the invention to provide a novel psychotherapy device wherein emotional states of sadness, anger, joy and love may be communicated by a child patient without requiring developed verbal skills.

It is another object of the invention to provide a novel psychotherapy device for a child patient wherein a degree of empathy may be established between the patient and the psychotherapy device.

It is a further object of the invention to provide a novel psychotherapy device wherein an aggressive expression of anger may be displayed with respect to the psychotherapy device without risking physical damage to the patient.

It is yet a further object of the invention to provide a novel psychotherapy device which may be useful in addressing the self image of a child when no abuser is evident in a relationship.

It is a related object of the invention to provide a novel psychotherapy device which may be advantageously utilized with a terminally ill child.

It is another related object of the invention to provide a novel psychotherapy device which may be advantageously utilized with a child which has received traumatic dismemberment and/or mutilation.

SUMMARY OF A PREFERRED EMBODIMENT

A psychotherapy device in accordance with a preferred embodiment of the invention includes a pliable child-like figure having a body portion and a pair of arms and legs and a head attached to the body. The head includes a face with a permanent neutral or expressionless pair of eyes and a permanent nose. A patch is attached beneath each eye which may operably receive indicia of tears. During psychotherapy of a child patient, the patient may be invited, with the permanently affixed eyes and nose as a neutral point of reference, to apply or remove tears to reflect a current or past mental state.

In addition to the foregoing, the psychotherapy device may include provision for applying smiling or frowning lips, eyebrows in various states, a heart patch expressive of a patient's mental state and/or color patches which may also reflect mood of a child patient.

The arms terminate in hands which are enlarged with disfigured and/or foreshortened fingers which subliminally state to the child that it is "all right" not to be physically perfect.

THE DRAWINGS

FIG. 1 is an axonometric illustration of a psychotherapy device in accordance with a preferred embodiment of the invention and comprises a child-like figure positioned upon a conventional chair;

FIG. 2, note sheet 2, is a front view of a psychotherapy device as shown in FIG. 1;

FIG. 3 is a right side view of the psychotherapy device depicted in FIG. 2;

FIG. 4, note sheet 1 again, is a front view of a face portion of the subject psychotherapy device disclosing a representation of an emotional state of well being, including smiling lips, raised eyebrows and the absence of tears;

FIG. 6 illustrate an optical element of the subject psychotherapy device comprising a patch depicting a heart;

FIG. 7 illustrates another optional element of the subject psychotherapy device comprising a patch depicting lips which may be considered smiling or frowning depending upon the orientation of application;

FIG. 8 illustrates another optional element of the subject psychotherapy device comprising grey matter representative of a mental state; and FIG. 9 illustrates still another optional element of the subject psychotherapy device comprising a color patch which may be useful to reflect an emotional state of a child patient.

DETAILED DESCRIPTION

Figure 1:
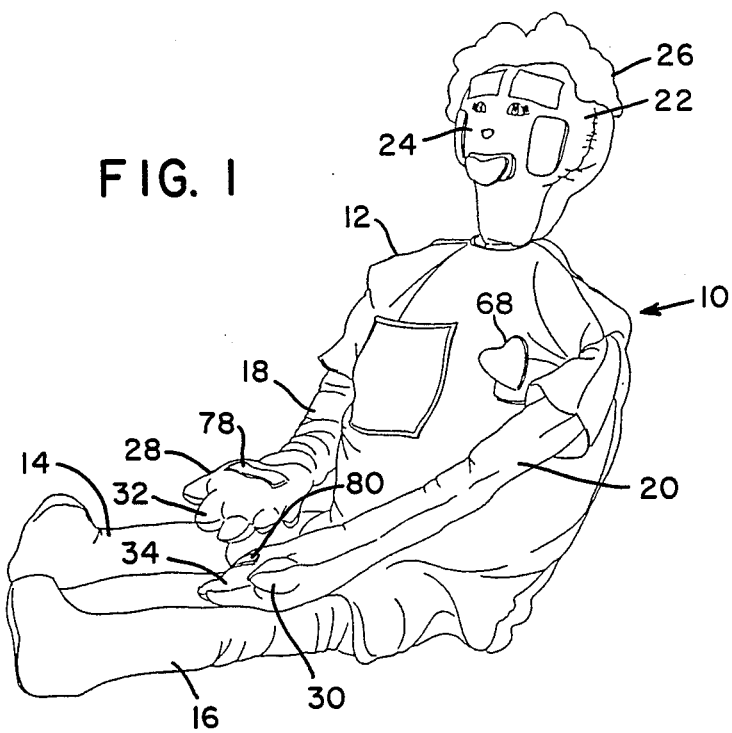
Figure 2:
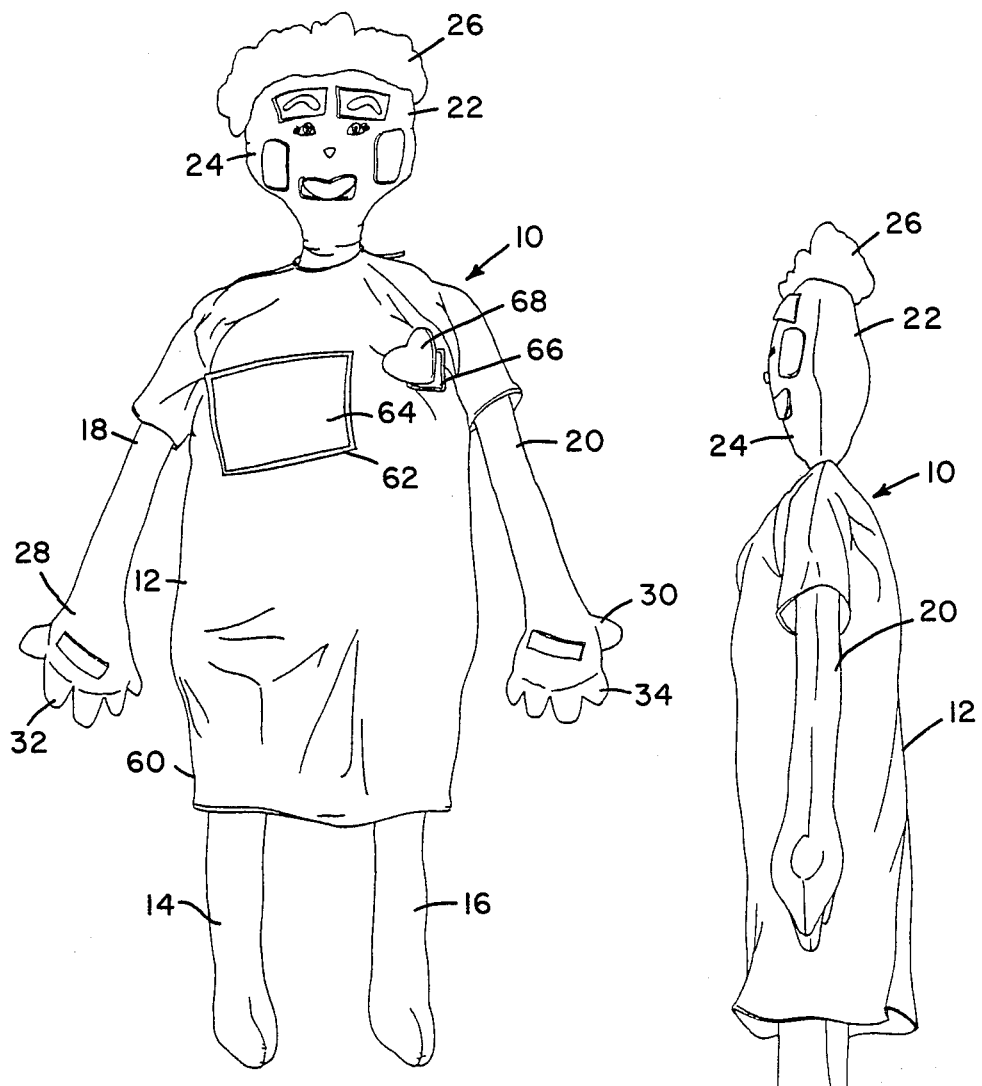
Figure 3:
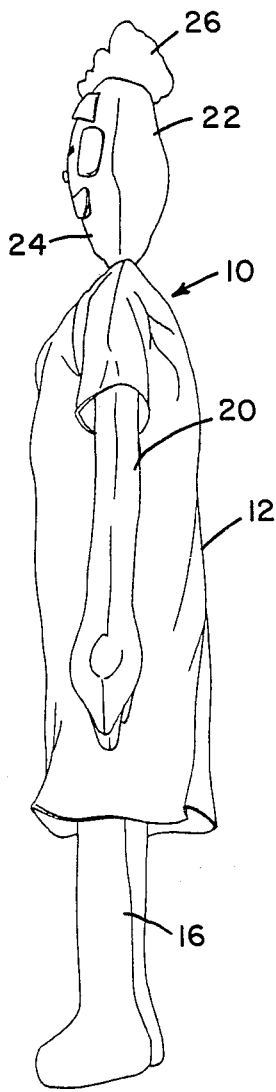

Referring now to the drawings and particularly to FIGS. 1–3 wherein like numerals indicate like parts, there will be seen various views of a psychotherapy device 10 in accordance with a preferred embodiment of the invention. More specifically, the subject psychotherapy device includes a child like figure having a body member 12, a pair of legs 14 and 16 and a pair of arms 18 and 20 connected to the body member in the general location of arms and legs of a human child. A head member 22 is connected to the body member and includes a face 24 and hair 26.

The shape of the head and hair are, like the body, arms and legs representative of a child-like human figure but are not intended to be physically accurate; particularly with respect to the arms and hands. In this latter connection, the hands are purposefully disfigured. More specifically, a pair of hands 28 and 30 are connected to the arms but are enlarged with respect to the hands of a normal child and the fingers 32 and 34 of the hands respectively, are disfigured and/or foreshortened as might be the case with respect to traumatic dismemberment, disease, and/or amputation by burning.

The entire child like figure is purposefully designed to be representative of a child while at the same time being less than perfect in proportion and general appearance to provide a subliminal statement to a psychotherapy patient that it is recognized and acceptable to be less than physically perfect.

Figures 4, 5:
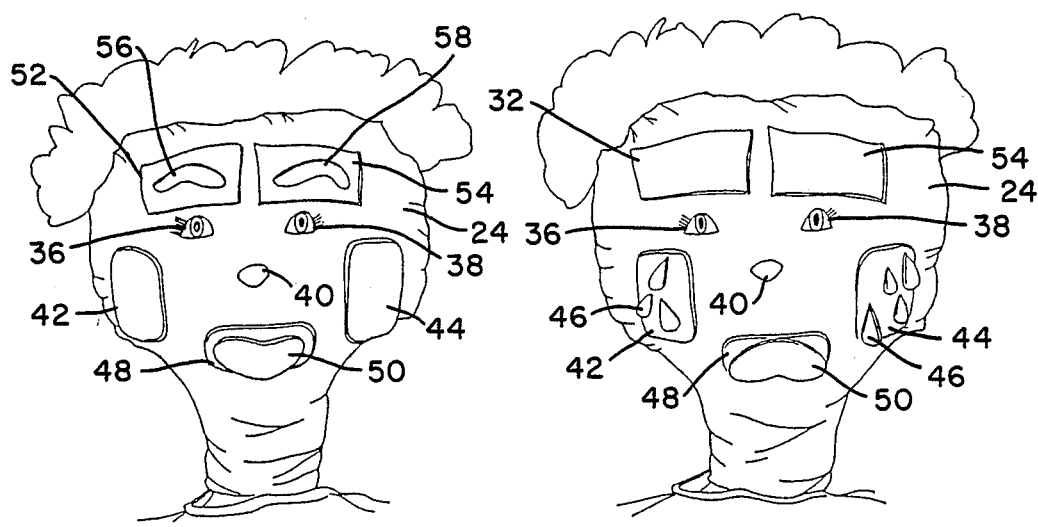
FIG. 5 is a front view of the face depicted in FIG. 4 but expressing a sad emotional state including the application of tears and downwardly turned lips.

Turning to FIGS. 4 and 5, detailed views of a head portion of the psychotherapy device are disclosed. The face 24 includes a pair of eyes 36 and 38 which are generally neutrally expressive and permanently affixed to the face by a patch being sewed onto the face, being painted onto the face structure or the like. In addition, a nose 40 is permanently affixed to the face and is generally positioned in a proportional relationship to the eyes to create a neutrual expression. The eyes and nose in combination provide a point of reference with respect to the face for application of indicia of emotion and feelings of a patient in a manner to be discussed below.

Positioned upon each cheek of the face 24 and generally beneath the permanent eyes 36 and 38 is a Velcro patch 42 and 44 respectively. Alternatively other release means may be utilized by Velcro patches having been found to produce desirable results. The Velcro patches are operative to receive indicia of tears and in this connection tear indicia pieces 46, having a compatable Velcro portion may be releasably adhered to the face by a patient during a psychotherapy session.

Another Velcro patch 48 is positioned in a general location of a childs mouth beneath the permanent nose 40 and is operative to receive indicia of lips 50. The lips, as will be discussed in detail below, may be turned upwardly or downwardly to reflect a sad or a smiling expression during a therapy session. In this connection, compare the position of the lips depicted in FIG. 5 which represent a sad expression with the position of the lips rotated 180° as illustrated in FIG. 4 which depict a rather pleasant or smiling expression.

Further Velcro patches 52 and 54 are positioned above the permanent eyes 36 and 38 respectively and operably receive eyebrow indicia 56 and 58. The eyebrows may be angled by a child patient to reflect a current mental state or mood and may be effectively utilized in cooperation with the tear and lip indicia to provide a face which is expressive of a mental state.

Returning to FIGS. 2 and 3, the therapeutic doll 10 is fitted with a loose fitting garment such as a dress 60. The dress in turn may have a pocket 62 with a transparent outer window panel 64 which is operative to receive indicia pieces 46, 50 and 56 which a patient may selectively apply to the face 24 of the psychotherapy device.

A still further Velcro patch 66 is preferably fitted to the psychotherapy device in a general location of the heart of the child like figure and is operative to receive a conventional Valentine-like heart figure or other indicia expressive of a mental state.

Referring specifically to FIG. 6, there will be seen an alternative Valentine-like heart FIG. 70 including a broken kerf 72 through the center of the heart which may be used to reflect feelings of a child patient. A whole heart 68, as shown in FIGS. 1 and 2 would be representative of a state of well being while a broken heart 70 as illustrated in FIG. 6 would be indicative of sorrow, trauma and hurt feelings.

FIG. 7 is a more detailed representation of the lips 50 which when turned in one orientation are illustrative of a smiling mouth and when rotated 180° in a downturned posture can be representative of a sad or sorrowful expression.

FIG. 8 depicts a cloud like patch 74 which is preferably gray in color and can be illustrative of the gray matter of the mind, a cloud like figure, and a general condition of inwardly reflecting sorrow.

FIG. 9 illustrates a geometric configuration of a further patch 76 which may be applied to the hands or heart area of the therapeutic device and may be colored red, green, yellow, blue and applied to the therapeutic device to reflect in combination with other features a picture of a mental condition of a child patient to a trained therapist in a psychotherapy setting.

The entire child like figure is preferably composed of a outer skin of cloth filled with a generally soft or pliable stuffing material so that the entire unit may be easily manipulated into various expressive configurations. A pair of Velcro strips 78 and 80 may be applied to the hands 28 and 30 respectively and thus are operative to enable a patient to join the hands together or to another portion of the body as desired. In addition, these Velcro strips 78 and 80 may operably receive color indicia patches 76 such as illustrated in FIG. 9.

The body portion of the doll is generally rectangular and non-descriptive and operably is heavily padded and may receive blows of anger from a child and/or hugs of love representative of a current and/or past mental state of the child.

BRIEF SUMMARY OF ADVANTAGES OF THE INVENTION

After reading and understanding the foregoing description of the invention, in conjunction with the drawings, it will be appreciated that several distinct advantages of the subject psychotherapy device are obtained.

Without attempting to set forth all of the desirable features of the instant invention, at least some of the major advantages include the unique combination of a psychotherapy device in the general form of a child wherein permanent eyes and nose provide a generally neutral expression and Velcro patches upon the cheeks of the face and in a mouth location permit a child patient to apply expressive indicia to the face of the device illustrating tears 46 and/or an upturned or downturned lips 50.

The subject invention in addition, includes a pair of Velcro patches in a posture above the generally neutral eyes 36 and 38 and operably receive indicia of eyebrows 56 and 58 in a variety of angular postures to enhance the expressive value of the face.

The psychotherapy device is configured with arms and hands which are disportionately large and fingers disfigured and/or foreshortened to subliminally state to a child in therapy that it is "all right" to be less than physically perfect.

The subject child like figure is manufactured with a pliable body portion which may operably receive blows of anger without injuring the child in therapy.

In addition, the body portion operably receives a further Velcro patch in the general location of a child's heart and operably receives a whole or broken heart configuration which can effectively guide a child therapist in its evaluation of the patient.

The hands of the subject psychotherapy device are fitted with Velcro straps to permit a hugging or embracing configuration and/or attachment of the hands to various portions of the body.

Still further a gray cloud like figure may be advantageously utilized to represent a mental state and colored patches may provide similar instructive indicia to a child psychologist.

In describing the invention, reference has been made to a preferred embodiment and illustrative advantages. Those skilled in the art, however, and familiar with the instant disclosure of the subject invention, may recognize additions, deletions, modifications, substitutions and/or other changes which will fall within the purview of the subject invention and claims.

I claim:

1. A psychotherapy device comprising:

a body member;

a pair of legs connected to said body member;

a pair of arms connected to said body member;

a head connected to said body member;

said head, body member, arms and legs being in the general configuration of a human figure;

said head having a face and said face having a permanent representation of a pair of eyes, and a nose permanently affixed thereto;

means connected to said face adjacent to and generally below each of said permanent eyes for releasably receiving indicia of tears;

tear indicia operably connectable to and releasable from said means for receiving indicia of tears;

means connected to said face adjacent to and generally below said permanent nose for releasably receiving indicia of a mouth; and mouth indicia operably connectable to and releasable from said means for receiving indicia of a mouth, wherein during psychoplay therapy of a child patient, the patient may be invited, with the permanently affixed eyes and nose as a neutral point of reference, to apply or remove and conform the mouth of the psychotherapy device to the face to reflect a current or past mental state of the patient.

2. A psychotherapy device as defined in claim 1 and further comprising:

means connected to said face adjacent to and generally above each of said permanent eyes for receiving indicia of eyebrows; and eyebrow indicia operably connectable to and releasable from said means for receiving indicia of eyebrows, wherein a child patient, may be invited to apply eyebrows to the face to reflect a current or past mental state of the patient.

3. A psychotherapy device as defined in claims 1 or 2 and further comprising:

means connected to said body member in the general location of a heart of a human for receiving indicia of a heart; and heart indicia operably connectable to and releasable from said means for receiving indicia of a heart, wherein a child patient may be invited to apply a heart to said body member to reflect a current or past mental state of the patient.

4. A psychotherapy device as defined in claim 3 wherein:

said heart indicia may operably be in a condition of a whole valentine heart shape.

5. A psychotherapy device as defined in claim 3 wherein:

said heart indicia may operably be in a condition of a broken valentine heart shape.

6. A psychotherapy device as defined in claim 3 wherein:

said body member is pliable and is operable to receive blows of anger and/or frustration from a child patient without injuring the patient.

7. A psychotherapy device as defined in claim 3 and further comprising:

color patch means operably connectable to and releasable from said means for receiving indicia of a heart, wherein a child patient may be invited to apply color to the psychotherapy device to reflect a current or past mood of the patient.

8. A psychotherapy device as defined in claim 1 wherein:

said arms terminate with hands which are proportionately enlarged when compared with a normal human hand.

9. A psychotherapy device as defined in claim 8 wherein:

said hands are fashioned with short disfigured fingers when compared with the fingers of a normal human hand.

10. A psychotherapy device in the general form of a child comprising:

a pliable body member;
a pair of legs connected to said pliable body member;
a pair of arms connected to said pliable body member;
a head connected to said pliable body member;
said head having a face and said face including,
  a permanent representation of a pair of eyes, and
  a permanent representation of a nose affixed thereto;
a release patch connected to said face adjacent to and generally below each of said permanent eyes; and
tear indicia means including a portion operably connectable to and releasable from said release patch adjacent said permanent eyes for permitting a patient to apply and remove tear indicia to the face of said psychotherapy device to reflect a current or past mental state of the patient.

11. A psychotherapy device in the general form of a child as defined in claim 10 and further comprising:

a release patch connected to said face adjacent to and generally below said nose; and
mouth indicia means including a portion operably connectable to and releasable from said release patch positioned generally below said nose for permitting a patient to apply reversible lips representing a smile or frown as desired.

12. A psychotherapy device in the general form of a child as defined in claim 11 and further comprising:

a release patch connected to said face adjacent to and generally above each of said permanent eyes; and
eyebrow indicia including a portion operably connectable to and releasable from said release patch above each eye of the psychotherapy device.

13. A psychotherapy device in the general form of a child as defined in claim 11 and further comprising:

a release patch connected to said body member in the general location of a heart of the child; and
heart indicia including a portion operably connectable to and releasable from said release patch, wherein a child patient may be invited to apply a heart to said body member to reflect a current or past mental state of the patient.

14. A psychotherapy device in the general form of a child as defined in claim 11 wherein:

said arms each terminate with hands which are enlarged when compared with a normal hand of a child model.

15. A psychotherapy device as defined in claim 14 wherein:

said enlarged hands include foreshortened fingers, when compared with a normal hand of a child model, that are suggestive of a physical impairment of the psychotherapy device.

* * * * *